US012589688B2

(12) United States Patent
Baker et al.

(10) Patent No.: US 12,589,688 B2
(45) Date of Patent: Mar. 31, 2026

(54) SIDE TURN INDICATOR INTEGRATED WITH A FENDER OF A VEHICLE

(71) Applicant: Rivian IP Holdings, LLC, Irvine, CA (US)

(72) Inventors: Simon Baker, Basingstoke (GB); Timothy Beaven, Bicester (GB); Siobhan Marie Casey, Newport Beach, CA (US); Jonathan James Szczupak, Laguna Niguel, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/000,432

(22) Filed: Dec. 23, 2024

(65) Prior Publication Data

US 2025/0282282 A1     Sep. 11, 2025

Related U.S. Application Data

(60) Provisional application No. 63/562,228, filed on Mar. 6, 2024.

(51) Int. Cl.
| | |
|---|---|
| *B60Q 1/38* | (2006.01) |
| *B60Q 1/32* | (2006.01) |
| *F21S 43/20* | (2018.01) |
| *F21W 103/20* | (2018.01) |

(52) U.S. Cl.
CPC .............. *B60Q 1/38* (2013.01); *B60Q 1/326* (2013.01); *F21S 43/265* (2024.05); *F21S 43/2817* (2024.05); *F21W 2103/20* (2018.01)

(58) Field of Classification Search
CPC ....................................................... B60Q 1/38
See application file for complete search history.

(56) References Cited

U.S. PATENT DOCUMENTS

| | | | |
|---|---|---|---|
| 6,910,788 B2 * | 6/2005 | Jones ..................... | B60Q 1/442 |
| | | | 362/240 |
| 9,963,001 B2 * | 5/2018 | Salter .................. | B60C 23/0405 |
| 2007/0091628 A1 * | 4/2007 | Van Order ............. | B60Q 1/326 |
| | | | 362/506 |
| 2008/0253140 A1 * | 10/2008 | Fleischmann .......... | G02B 6/006 |
| | | | 29/832 |
| 2009/0115631 A1 * | 5/2009 | Foote .................... | B60R 1/0602 |
| | | | 340/901 |

(Continued)

FOREIGN PATENT DOCUMENTS

| | | |
|---|---|---|
| CN | 110778987 A | 2/2020 |
| CN | 118339403 A | 7/2024 |
| DE | 102023118868 A1 | 1/2025 |

*Primary Examiner* — Eric T Eide
(74) *Attorney, Agent, or Firm* — BAKERHOSTETLER

(57) ABSTRACT

Vehicle fenders for vehicles include a side turn indicator. A vehicle fender may include a recess portion, and the side turn indicator, including a light source, may be disposed in the recessed portion. The vehicle fender may hide, or otherwise obscure, the light source when the side turn indicator in an inactive mode (e.g., not illuminated). However, when the light source is in an active mode (e.g., the side turn indicator is illuminated), light from the light source is visible through any structure of the side turn indicator and the side turn indicator is visible to present an indication to which the vehicle may turn. Further, the side turn indicator, when illuminated, is generally no longer hidden/obscured by the vehicle fender.

20 Claims, 9 Drawing Sheets

(56)                    References Cited

U.S. PATENT DOCUMENTS

| | | | |
|---|---|---|---|
| 2011/0181185 A1* | 7/2011 | Day | B60Q 1/326 |
| | | | 315/77 |
| 2018/0208105 A1* | 7/2018 | Salter | F21S 43/14 |

* cited by examiner

700

PROVIDE A FENDER BODY — 702

COUPLE A SIDE TURN INDICATOR WITH THE
FENDER BODY — 704

SIDE TURN INDICATOR INTEGRATED WITH A FENDER OF A VEHICLE

CROSS-REFERENCE TO RELATED APPLICATION(S)

This application claims the benefit of priority to U.S. Provisional Application No. 63/562,228, filed on Mar. 6, 2024, titled "TURN SIGNAL INDICATOR INTEGRATED WITH A FENDER OF A VEHICLE", the disclosure of which is incorporated herein by reference in its entirety.

INTRODUCTION

The present disclosure is directed to vehicles, and more particularly, vehicles with turn signals integrated with fenders positioned on a vehicle.

SUMMARY

Vehicles may include one or more lamps, some of which are used to provide an indication to drivers in other vehicles as well as to pedestrians. For example, vehicles may include lamps designed to illuminate and provide a side turn indication when the vehicle intends to turn in a direction (e.g., left turn, right turn). In one or more implementations, the one or more light sources are integrated with a vehicle fender of the vehicle.

In one or more aspects of the present disclosure, a system is described. The system may include a light source on a vehicle body. The system may further include an overlay of the light source. The light source may be configured to direct light to the overlay. The vehicle body may include a vehicle fender. The overlay may include lettering and may be coupled with the vehicle fender. The light source may be configured to direct the light to the lettering. The vehicle fender may further include a recessed portion, and the light source may be disposed in the recessed portion.

The vehicle fender may include a U-shaped body configured to surround a wheel of a vehicle. The overlay may include lettering. The light source may be configured to direct a portion of the light to the lettering on a vehicle fender.

The system may further include a lens between the overlay and the light source. The light source may include a side turn indicator for a vehicle. The overlay may include lettering that least partially covers the side turn indicator. The overlay may include a coating. The coating may be configured to at least partially match a color of a vehicle fender.

The system may further include a housing configured to carry the light source and couple with a vehicle fender. The lens may be positioned between the overlay and the housing.

In one or more aspects of the present disclosure, a vehicle fender is described. The vehicle fender may include a fender body configured to surround a wheel of a vehicle. The vehicle fender may further include a light source carried by the fender body. The light source may be configured to provide a turn signal for the vehicle.

The vehicle fender may further include a housing coupled with the fender body. The housing may carry the light source. The vehicle fender may further include an overlay coupled with the housing. The light source may be configured to direct light toward the overlay.

The vehicle fender may further include a lens. The lens may be positioned between the housing and the overlay. The light source may be positioned between the housing and the lens. The overlay may include an indicium. The light source may be configured to direct light toward the indicium. The indicium may be selected from a group consisting of lettering or a logo.

The vehicle fender may further include a coating disposed on the overlay. The coating may be configured to at least partially match a color of the fender body. The fender body may include a recessed portion. The light source may be disposed in the recessed portion.

In one or more aspects of the present disclosure, a vehicle is described. The vehicle may include a wheel. The vehicle may further include a fender that at least partially surrounds the wheel. The fender may include a fender body may include a recessed portion. The fender may further include a light source carried by the fender body at the recessed portion. The light source may be configured to provide a turn signal for the vehicle.

The vehicle may further include a housing coupled with the fender body. The housing may carry the light source an overlay coupled with the housing. The light source may be configured to direct light toward the overlay. The light source may further include a lens. The lens may be positioned between the housing and the overlay. The light source may be positioned between the housing and the lens.

Systems, including fenders and/or side mirrors, integrated with a vehicle may include a side mounted light that includes light emission devices, a first lens and a second feature (e.g., lens or transmissive lettering). The side mounted light may include a turn signal or a side marker light. The turn signal may be configured to emit a flashing light when activated by a driver control. The flashing light may be synchronized with at least one of a front and rear turn signal light. The side mounted light may emit an amber color, a 2 Amber color, or a red color. The side mounted light may emit a red light with a minimum photometric intensity of 0.25 (cd)(2) when viewed from a 45 degree left or a 45 degree right test point. The side mounted light may emit an amber light with a minimum photometric intensity of 0.62 (cd)(2) when viewed from a 45 degree left or a 45 degree right test point. The side mounted light may include a mounting height of not less than 15 inches. The side mounted light may include a mounting height of not more than 83 inches from the ground.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The present disclosure is directed to side mounted light sources, such as side turn indicators, integrated with features such as a vehicle fender. Vehicles described herein may include a vehicle fender for each wheel of a vehicle. At least some of the vehicle fenders may include a side turn indicator. In this regard, side mounted lights located on a fender and shown and/or described herein may include a turn signal or a side marker light. The turn signal may be configured to emit a flashing light when activated by a driver-initiated control. The flashing light may be part of one or more flashing lights at the front and rear of the vehicle, with the one or more flashing lights synchronized to flash (e.g., turn on and turn off) at the same time or near the same time. In this regard, the side turn indicator, when in an active mode (e.g., illuminated and flashing), may provide an indication to which direction the vehicle is turning. As non-limiting examples, the side mounted light may emit a color such as amber, 2 Amber, or red. In one or more implementations, the turn signal may be disposed in a recess of the vehicle fender. The side turn indicator may be hidden, or otherwise obscured, by the vehicle fender. The side turn indicator may include a lens that provides an overlay, or cover, to a light source. The lens may be covered or coated with a material, thus shading the lens and changing the appearance of the lens. However, when illuminated, the side turn indicator generates light that passes through lens, including the material, such that the light is visible to drivers and passengers in other vehicles and/or pedestrians near the vehicle.

Figure 1:
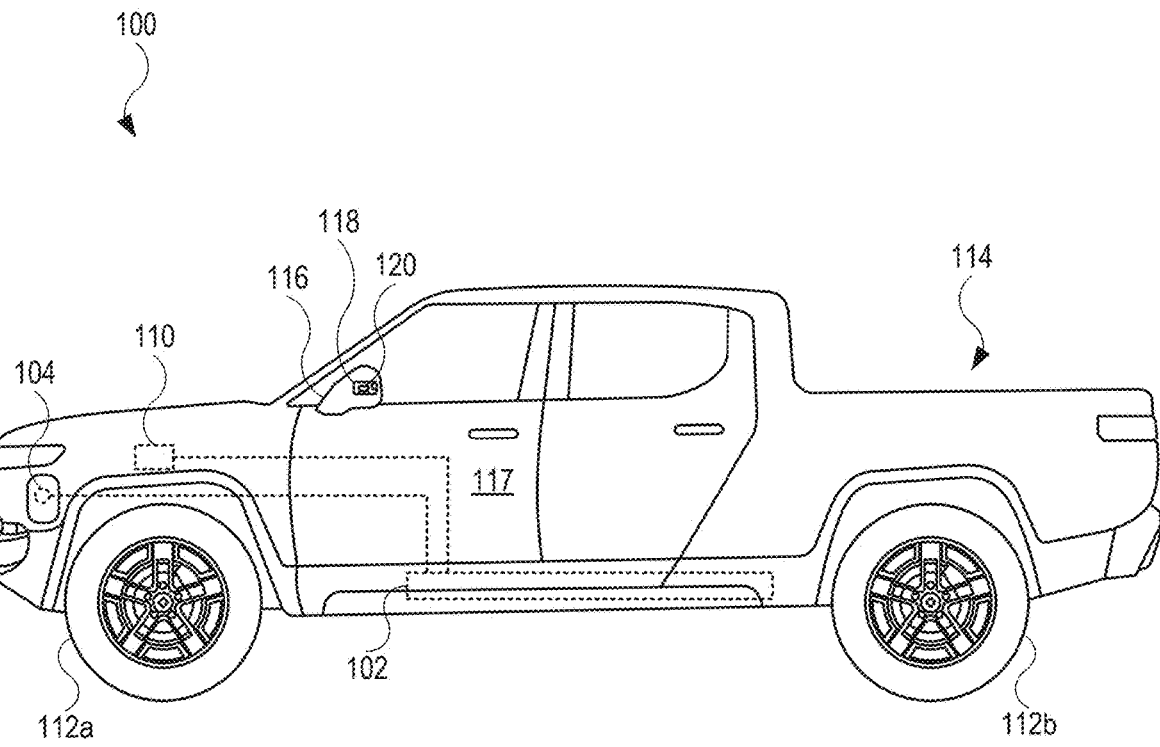
FIG. 1 illustrates a side view of an example of a vehicle, in accordance with one or more aspects of the present disclosure.

FIG. 1 illustrates an example of a vehicle 100, in accordance with aspects of the present disclosure. In the example shown in FIG. 1, the vehicle 100 takes the form of a truck.

Generally, the vehicle 100 may take the form of any motorized vehicle, including motorized vehicles with an internal combustion engine and/or one or more electric motors. Accordingly, other implementations of the vehicle 100 may include land-based vehicles, such as a car (e.g., sedan, hatchback), a van, or a commercial truck, as non-limiting examples.

The vehicle 100 may include a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., alternating current (AC) power) that is converted to direct current (DC) power to charge the battery pack 102. The battery pack 102 may couple to a drive unit 110, representative of one or more drive units of the vehicle 100. While the drive unit 110 is shown as generally being in the front of the vehicle 100, the drive unit 110 may be located in the rear of the vehicle 100. Further, when multiple drive units are used, at least one drive unit may be in the front of the vehicle 100 to drive the front wheels (e.g., wheel 112a), and at least one drive unit may be in the rear of the vehicle 100 to drive the rear wheels (e.g., wheel 112b). The drive unit 110 may include, for example, a motor, an inverter, a gear box, and a differential. In the example shown in FIG. 1, the drive unit 110 takes the form of an electric motor. In this regard, the drive unit 110 may use energy (e.g., electrical energy) stored in the battery pack 102 for propulsion in order to drive (e.g., rotationally drive) wheels of the vehicle 100. The vehicle 100 may further include a bed 114 that may be used as a storage area for the vehicle 100.

Further, the vehicle 100 may include a side mirror 116. The side mirror 116 may couple with, and extend from, a door 117 (e.g., driver side door representative of a passenger side door) of the vehicle 100. In one or more implementations, the side mirror 116 takes the form of a driver side mirror. In this regard, the side mirror 116 may provide, based on a reflection from a mirror (not shown in FIG. 1), an image of objects lateral and/or behind a driver's side of the vehicle 100. The side mirror 116 may further include an image sensor 118 (e.g., camera) that provide digital images (e.g., still images, motion images) of objects external to the vehicle 100, such as lateral and/or behind a driver's side of the vehicle 100. Additionally, the side mirror 116 may include a side turn indicator 120. The side turn indicator 120 may include one or more light sources (not shown in FIG. 1) that, when illuminated, provide an indication of travel of the vehicle 100 (e.g., left turn). Although not shown in FIG. 1, the vehicle 100 may include an additional apparatus that takes the form of a passenger side mirror that include any features shown and/or described for the side mirror 116, with the additional apparatus provide images of objects lateral and/or behind a passenger's side of the vehicle 100, and includes one or more light sources that, when illuminated, provide an indication of travel of the vehicle 100 (e.g., right turn).

Figure 2:
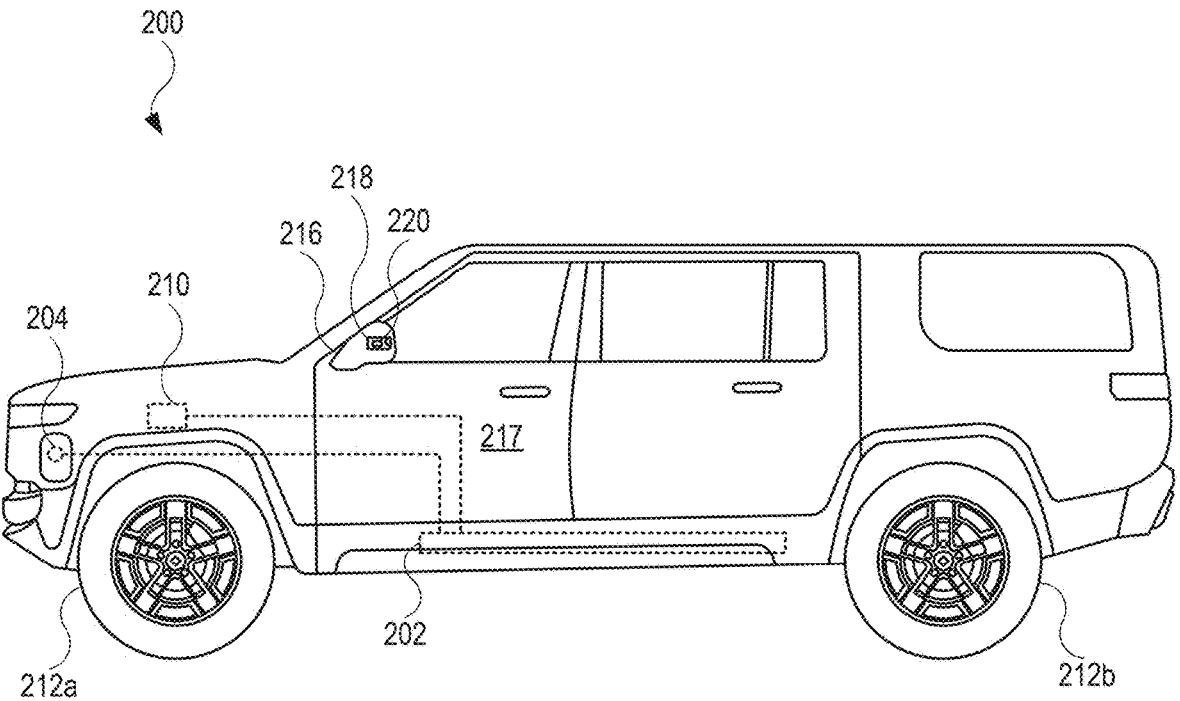
FIG. 2 illustrates a side view of an alternate example of a vehicle, in accordance with one or more aspects of the present disclosure.

FIG. 2 illustrates a side view of an alternate example of a vehicle 200, in accordance with one or more aspects of the present disclosure. As shown, the vehicle 200 takes the form of a sport utility vehicle (SUV). The vehicle 200 may include several features shown and/or described for the vehicle 100 (shown in FIG. 1). For example, the vehicle 200 may include a battery pack 202, a port 204 (e.g., charge port), a drive unit 210 (representative of one or more additional drive units), a wheel 212*a* (representative of an additional front wheel), and a wheel 212*b* (representative of an additional rear wheel).

Further, the vehicle 200 may include a side mirror 216. The side mirror 216 may couple with, and extend from, a door 217 (e.g., driver side door representative of a passenger side door) of the vehicle 200. In one or more implementations, the side mirror 216 takes the form of a driver side mirror. In this regard, the side mirror 216 may provide, based on a reflection from a mirror (not shown in FIG. 2), an image of objects lateral and/or behind a driver's side of the vehicle 200. The side mirror 216 may further include an image sensor 218 (e.g., camera) that provide digital images (e.g., still images, video images) of objects lateral and/or behind a driver's side of the vehicle 200. Additionally, the side mirror 216 may include a side turn indicator 220. The side turn indicator 220 may include one or more light sources (not shown in FIG. 2) that, when illuminated, provide an indication the vehicle 200 may turn (e.g., left turn). Although not shown in FIG. 2, the vehicle 200 may include an additional apparatus that takes the form of a passenger side mirror that include any features shown and/or described for the side mirror 216, with the additional apparatus provide images of objects lateral and/or behind a passenger's side of the vehicle 200, and includes one or more light sources that, when illuminated, provide an indication the vehicle 200 may turn (e.g., right turn).

Figure 3:
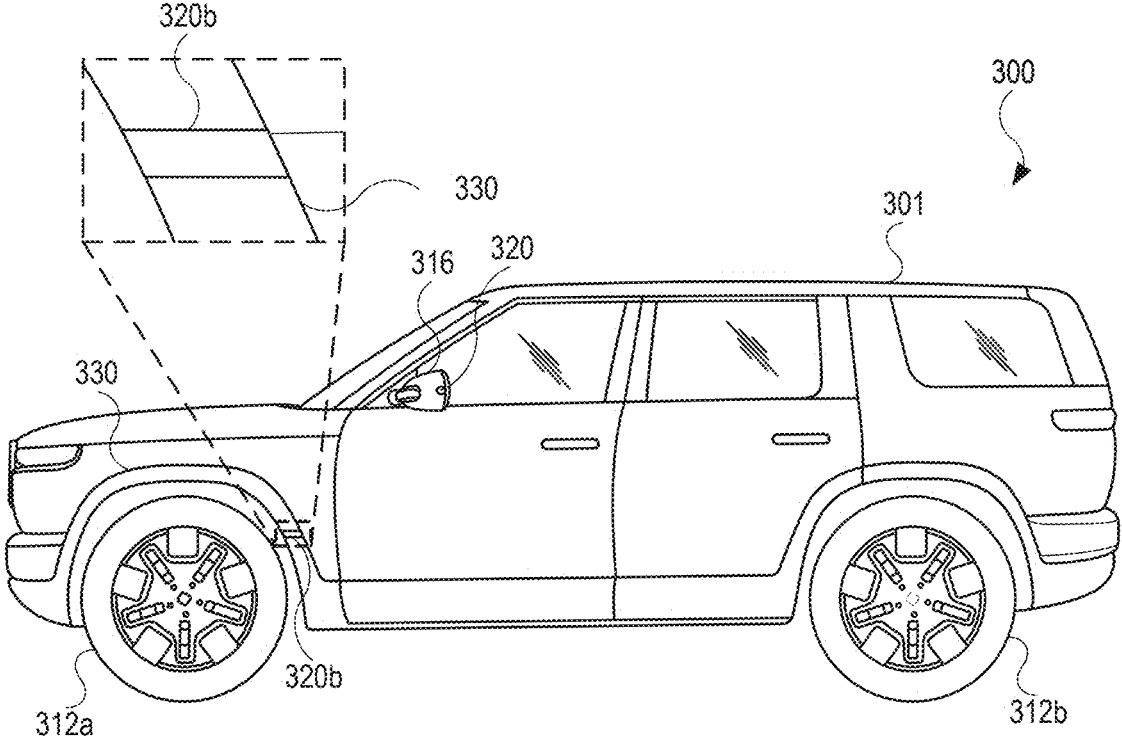
FIG. 3 illustrates a side view of an alternate example of a vehicle, showing side turn indicators of the vehicle, in accordance with one or more aspects of the present disclosure.

FIG. 3 illustrates a side view of an alternate example of a vehicle 300, showing side turn indicators of the vehicle 300, in accordance with one or more aspects of the present disclosure. The vehicle 300 may include a body 301 (e.g., vehicle body) and a side mirror 316 (e.g., side mirror) coupled with the body 301. The side mirror 316 may include a side turn indicator 320*a*. Additionally, the vehicle 300 may include a wheel 312*a* and a wheel 312*b*, representative of additional wheels. The vehicle 300 may further include fenders that surround the wheels of the vehicle 300. For example, the vehicle 300 may include a fender 330 (e.g., vehicle fender) that surrounds, or at least partially surrounds the wheel 312*a*.

The vehicle 400 may further include a side turn indicator 320*b*. As shown in the enlarged view, the side turn indicator 320 may be integrated with and carried by the fender 330. In one or more implementations, the vehicle 300 include four wheels and a corresponding number (e.g., four) fenders. Any fender of the vehicle 300 may include a side turn indicator. Also, the side turn indicator 320 may be substituted with other features such as a side marker or a reflector, as non-limiting examples.

Figure 4:
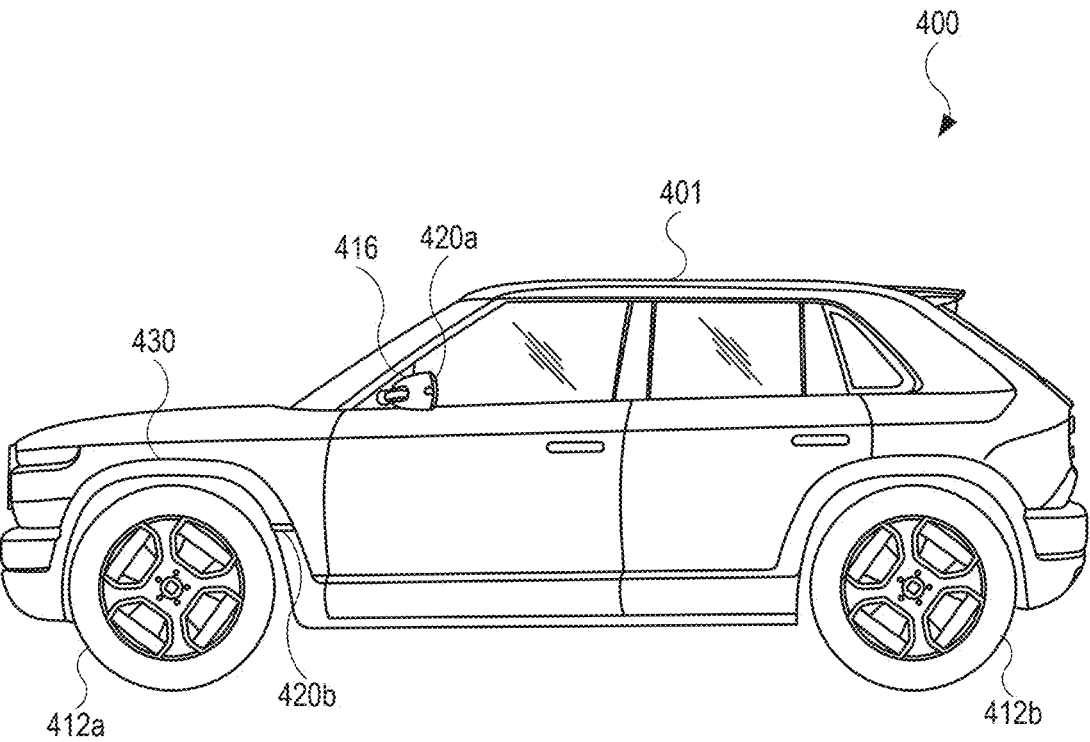
FIG. 4 illustrates a side view of an alternate example of a vehicle, showing side turn indicators of the vehicle, in accordance with one or more aspects of the present disclosure.

FIG. 4 illustrates a side view of an alternate example of a vehicle 400, showing side turn indicators of the vehicle 400, in accordance with one or more aspects of the present disclosure. The vehicle 400 may include a body 401 (e.g., vehicle body). As shown, the body 401 may include a different shape than prior examples of a body of a vehicle. The vehicle 400 may further include a side mirror 416 (e.g., side mirror) coupled with the body 401. The side mirror 416 may include a side turn indicator 420*a*. Additionally, the vehicle 400 may include a wheel 412*a* and a wheel 412*b*, representative of additional wheels. The vehicle 400 may further include fenders that surround the wheels of the vehicle 400. For example, the vehicle 400 may include a fender 430 that surrounds, or at least partially surrounds the wheel 412*a*.

The vehicle 400 may further include a side turn indicator 420*b*. As shown in the enlarged view, the side turn indicator 420*b* may be integrated with and carried by the fender 430.

In one or more implementations, the vehicle 400 include four wheels and a corresponding number (e.g., four) fenders. Any fender of the vehicle 400 may include a side turn indicator. Also, the side turn indicator 420*b* may be substituted with other features such as a side marker or a reflector, as non-limiting examples.

Referring to FIG. 3 and FIG. 4, the side turn indicators 320*b* and 420*b* may function as a turn signal for the vehicle 300 and the vehicle 400, respectively. In this regard, each of the turn signal indicators 320*b* and 420*b* may be configured to emit a flashing light when activated by a driver-initiated control. The flashing light may be part of one or more flashing lights at the front and rear of the vehicle, with the one or more flashing lights synchronized to flash (e.g., turn on and turn off) at the same time or near the same time. As an example, the side turn indicator 320*b* and the side turn indicator 420*b* may flash with the side turn indicator 320*a* and the side turn indicator 420*a*, respectively, at the same time or near the same time. Also, the side turn indicators 320*b* and 420*b*, when in an active mode (e.g., illuminated and flashing), may provide an indication to which direction the vehicle 300 and the vehicle 400, respectively, is turning. As non-limiting examples, each of the side turn indicators 320*b* and 420*b* may emit a color such as amber, 2 Amber, or red. Alternately, the side turn indicators 320*b* and 420*b* may function as a side marker for the vehicle 300 and the vehicle 400, respectively.

In one or implementations, the side mounted light (e.g., a side turn indicator) may emit a red light with a minimum photometric intensity of 0.25 (cd)(2) when viewed from a 45 degree left or a 45 degree right test point. The side mounted light may emit an amber light with a minimum photometric intensity of 0.62 (cd)(2) when viewed from a 45 degree left or a 45 degree right test point. The side mounted light may include a mounting height of not less than 15 inches. For example, each of the side turn indicators 320*a* and 320*b* (shown in FIG. 3) may be mounted at least 15 inches measured from a reference surface (e.g., surface on which the vehicle 300 is positioned). The side mounted light may include a mounting height of not more than 83 inches from the ground. For example, each of the side turn indicators 320*a* and 320 (shown in FIG. 3) may be mounted at most 83 inches measured from a reference surface (e.g., surface on which the vehicle 300 is positioned).

Figure 5:
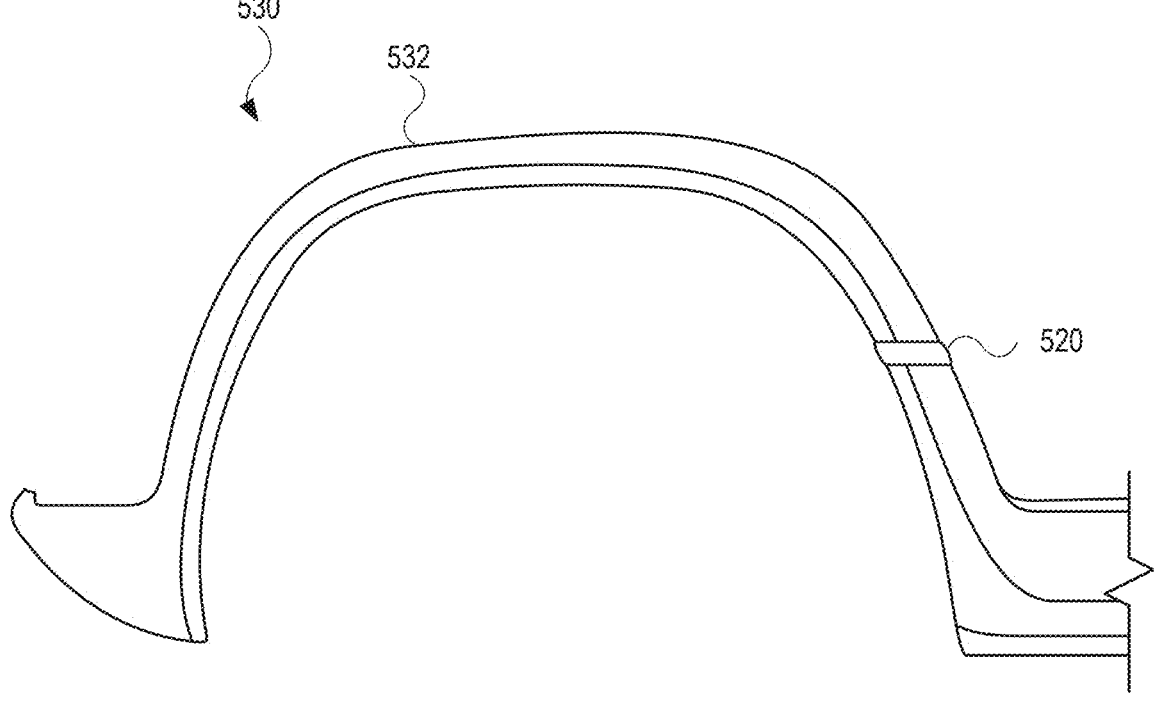
FIG. 5 illustrates a side view of a fender, in accordance with one or more aspects of the present disclosure.

FIG. 5 illustrates a side view of the fender 530, in accordance with one or more aspects of the present disclosure. The fender 530 may include a fender body 532 that couples with a vehicle body of a vehicle (e.g., body 301 and body 401 shown in FIG. 3 and FIG. 4, respectively). The fender body 532 may carry the side turn indicator 520. The fender body 532 may include a U-shaped body. As a result, the fender body 532 may surround, or at least partially surround, a wheel (e.g., wheel 312*a* and a wheel 412*a* shown in FIG. 3 and FIG. 4, respectively).

Figure 6A:
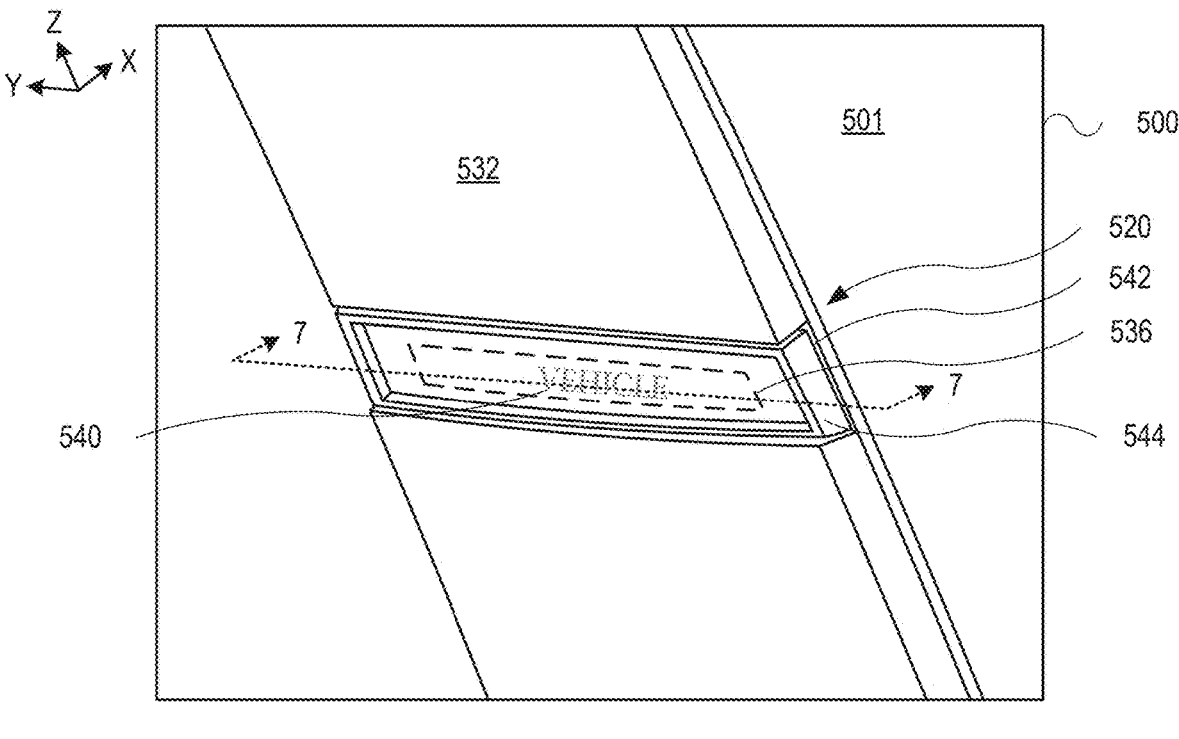
FIG. 6A illustrates an enlarged view of a vehicle, showing a side turn indicator in an inactive mode, in accordance with one or more aspects of the present disclosure.

FIG. 6A illustrates an enlarged view of a vehicle 500, showing the side turn indicator 520 in an inactive mode, in accordance with one or more aspects of the present disclosure. As shown, the fender 530 is coupled with a body 501 of the vehicle 500. The vehicle 500 may take the form of any prior example of a vehicle. The side turn indicator 520 may include a light source 536. In the inactive mode, the light source 536 is off, and accordingly, the side turn indicator 520 is not illuminated. The side turn indicator 520 may further include an indicium 540 (or indicia). In one or more implementations, the indicium 540 takes the form of lettering (e.g., letters), which may form a word or words. As non-limiting examples, the indicium 540 may be applied through operations such as printing or painting. Also, as a non-limiting example, the lettering may spell the name of the manufacturer of the vehicle 500. The lettering may include transmissive lettering, opaque lettering, or semi-transparent lettering. Alternatively or in combination, the indicium 540 takes the form of a logo representative of the manufacturer of the vehicle 500.

Also, the fender body 532 may include a recess 542. In one or more implementations, the recess 542 includes a dimension (e.g., depth into the fender body along the X-axis of Cartesian coordinates). The dimension may be approximately in the range of 10-20 millimeters (mm). In one or more implementations, the depth is 15 mm. As shown, the side turn indicator 520, including its components (e.g., the light source 536), is positioned, or at least partially positioned, in the recess 542 of the fender body 532. Alternatively, in one or more implementations, the fender body 532 does not include a recess and the side turn indicator 520 is positioned on an external surface of the fender body 532.

In the inactive mode, the side turn indicator 520 is hidden, or at least obscured, from view based on one or more factors. For example, the side turn indicator 520 may include an overlay 544, or lens, that is formed from a transparent, or semi-transparent material, such as plastic. As a result, at least a portion of the fender body 532 may be viewable through the side turn indicator 520 while the side turn indicator 520 is in the inactive mode. Additionally, the side turn indicator 520 may be coated by a material that either renders an opaqueness (e.g., opaque material on the overlay 544) or a transparent/semi-transparent (e.g., smoke material on the overlay 544) condition of the side turn indicator 520. This will be discussed in further detail below. Moreover, based in part on the material, in the inactive mode of the side turn indicator 520, the indicium 540 is generally hidden or at least obscured.

Figure 6B:
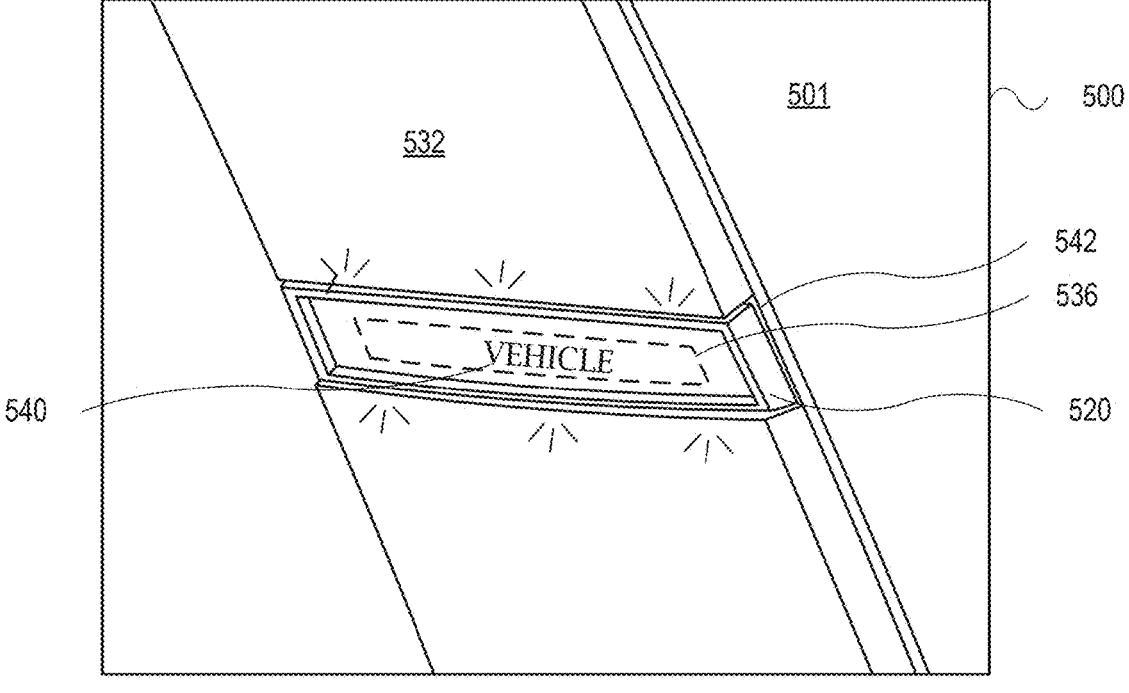
FIG. 6B illustrates an enlarged view of the vehicle shown in FIG. 6A, showing a side turn indicator in an active mode, in accordance with one or more aspects of the present disclosure.

FIG. 6B illustrates an enlarged view of the vehicle 500 shown in FIG. 6A, showing the side turn indicator 520 in an active mode, in accordance with one or more aspects of the present disclosure. In the active mode of the side turn indicator 520, the light source 536 is illuminated and the light source 536 is turned on. The active mode of the side turn indicator 520 may include flashing or blinking (e.g., on and off) of the light source 536 at a predetermined frequency. As a result, the light source 536 provides light that passes through the side turn indicator 520. Moreover, the light from the light source 536 is directed toward the indicium 540, where the light passes around the indicium 540. As a result, the side turn indicator 520, including the indicium 540, is no longer hidden or obscured. In this regard, the side turn indicator 520, based in part on the light generated by the light source 536, and the indicium 540 may be visible. Moreover, the light from the light source 536 is directed toward the indicium 540, causing contrast between the side turn indicator 520 and the fender body 532, as well as between the light and the indicium 540. Accordingly, the indicium 540 may be relatively more visible in the active mode of the side turn indicator 520. Beneficially, the side turn indicator 520 is hidden, or at least substantially hidden, in the inactive mode, but is readily viewable by others, including other drivers, passengers and/or pedestrians in the vicinity of the vehicle 500, thus providing an indication the vehicle 500 is turning in a particular direction.

Figure 7:
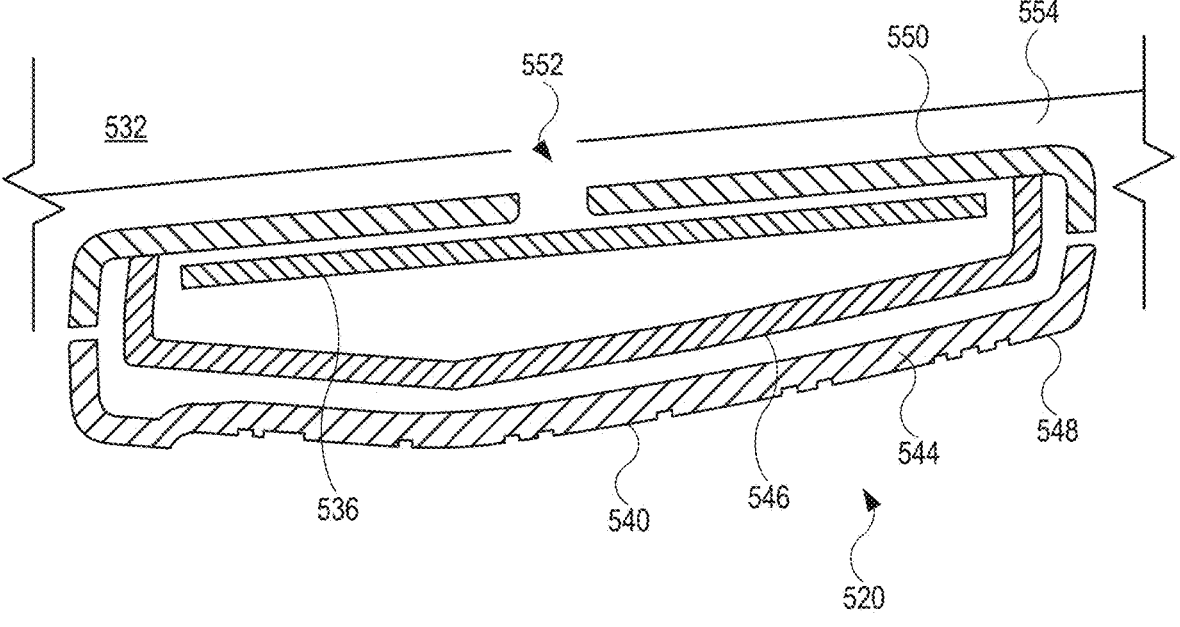
FIG. 7 illustrates a cross-sectional view of an example of a side turn indicator shown in FIG. 6A, taken along line 7-7, showing additional features of the side turn indicator, in accordance with one or more aspects of the present disclosure.

FIG. 7 illustrates a cross-sectional view of an example of a side turn indicator 520 shown in FIG. 6A, taken along line 7-7, showing additional features of the side turn indicator 520, in accordance with one or more aspects of the present disclosure. The side turn indicator 520 may include a light source 536, representative of one or more LEDs or incandescent bulbs. The side turn indicator 520 may further include a cover 546, or lens, that covers the light source 536. The cover 546 may project and/or direct light from the light source 536 in the active mode. The side turn indicator 520 may further include an overlay 544. The overlay 544 may include a transparent or semi-transparent body. A material 548, or coating, may be applied to the overlay 544 to change the appearance of the overlay 544, and in turn, the appearance of the side turn indicator 520. The material 548 may include a semi-transparent material (e.g., smoke material) designed to match the appearance of a fender body (e.g., fender body 532 shown in FIG. 6A) as well as match the appearance of a vehicle body (e.g., body 501 shown in FIG. 6A). Alternatively, the material 548 may not be present, and the overlay 544 may be formed with a material (e.g., pigment, dye) such that the overlay 544 matches the appearance of the fender body 532 as well as matches the appearance of a vehicle body (e.g., body 501 shown in FIG. 18). In one or more implementations, indicium 540 is formed (e.g., molded, embossed) into the overlay 544. Alternatively, or in combination, the overlay 544 may include a material (e.g., opaque material such as ink or paint) that forms the indicium 540.

The side turn indicator 520 may further include housing 550 coupled with the overlay 544. The housing 550 may carry components such as the light source 536 and the cover 546, and a circuit board (not shown in FIG. 7). The housing 550 may include an opening 552 to receive, for example, wires and/or flexible circuitry to make electrical connections with the light source 536 and/or the circuit board. The housing 550 may be designed to couple with the fender body 532. In one or more implementations, when the side turn indicator 520 is coupled with the fender body 532 by one or more of a screw, a fastener, a clip, or the like, a gap 554 may be present between the fender body 532 and the housing 550. In this regard, air may pass through the gap 554 while the vehicle 500 (shown in FIG. 6A) is in motion.

Several relationships among the components of the side turn indicator 520 may be present. For example, the light source 536 may be positioned between the housing 550 and the cover 546. Also, the cover 546 may be positioned between the light source 536 and the overlay 544.

Figure 8:
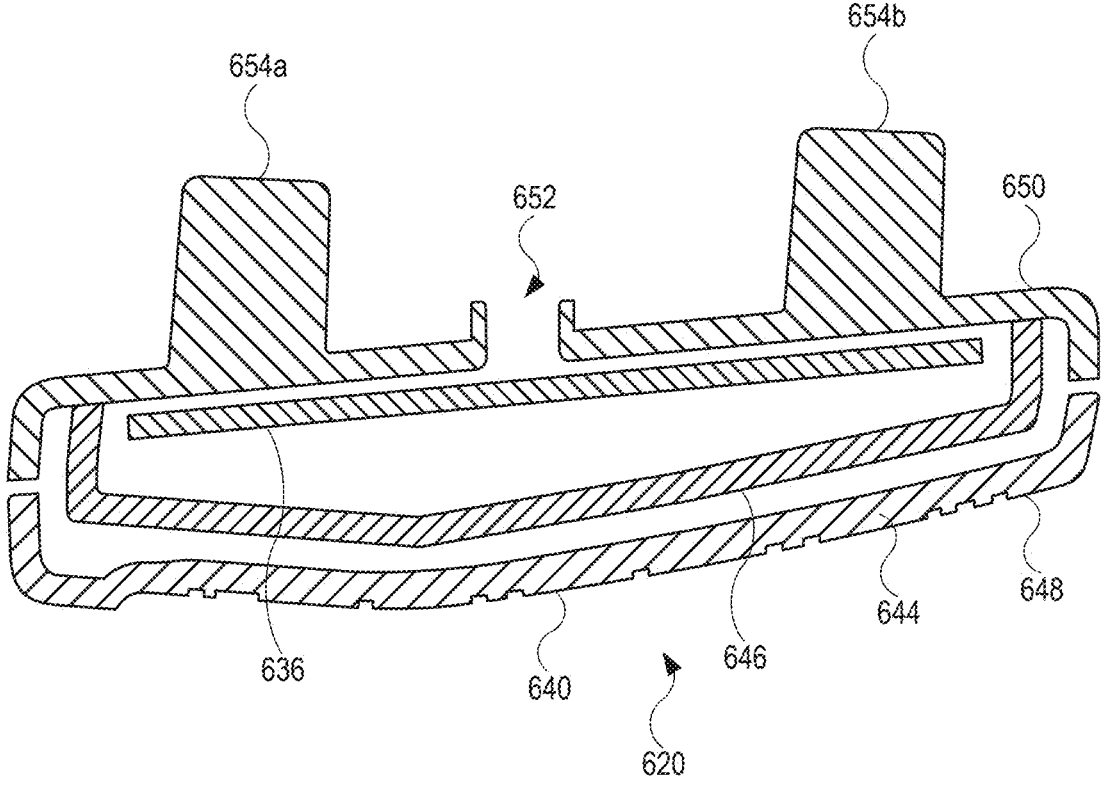
FIG. 8 illustrates a cross-sectional view of an alternate example of a side turn indicator, in accordance with one or more aspects of the present disclosure.

FIG. 8 illustrates a cross-sectional view of an alternate example of a side turn indicator 620, in accordance with one or more aspects of the present disclosure. The side turn indicator 620 may include any features shown and/or described for the side turn indicator 520 (shown in FIG. 7), including a light source 636, an indicium 640, an overlay 644, a cover 646, a material 648 (applied to the overlay 644), a housing 650, and an opening 652 formed in the housing 650. Additionally, the housing 650 may further include an extension 654a and an extension 654b, each of which being designed to couple with a fender body of a vehicle (not shown in FIG. 8).

Figure 9:
FIG. 9 illustrates a flow diagram showing example of a process that may be performed for assembling a system, in accordance with one or more aspects of the present disclosure.
Figure 9:
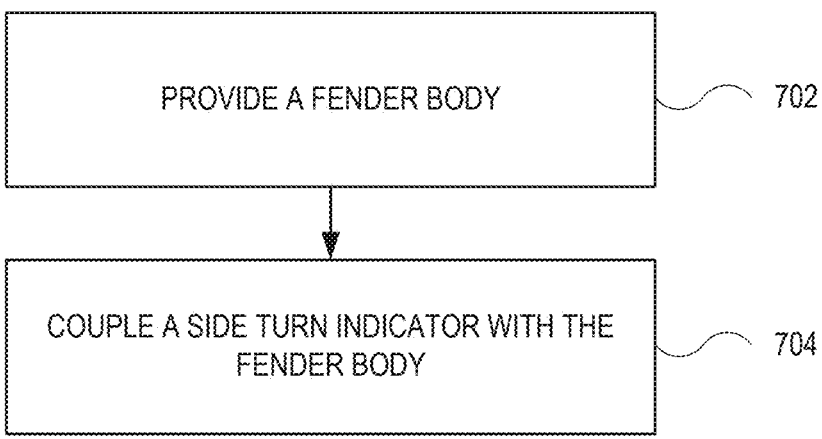

FIG. 9 illustrates a flow diagram showing example of a process 700 that may be performed for assembling a system, in accordance with one or more aspects of the present disclosure. For explanatory purposes, the process 700 primarily described herein with reference to the side turn indicators integrated with a fender, including a fender body, shown and/or described in FIGS. 1-8 and the accompanying portions of this detailed description. However, the process 700 are not limited to the apparatuses shown and/or described in FIGS. 1-8, and one or more blocks (or operations) of the process 700 may be performed by one or more other components of other suitable moveable apparatuses, devices, or systems. Further for explanatory purposes, some of the blocks of the process 700 are described herein as occurring in serial, or linearly. However, multiple blocks of the process 700 may occur in parallel. In addition, the blocks of the process 700 need not be performed in the order shown and/or one or more blocks of the process need not be performed and/or can be replaced by other operations.

At block 702, a fender body is provided. The fender body may be coupled, or integrated, with a vehicle body of a vehicle. The fender body may include a recessed portion.

At block 704, a side turn indicator is coupled with the fender body. The side turn indicator may be coupled with the fender body at the recessed portion. The side turn indicator may be hidden, or obscured, by, for example, the fender body when the side turn indicator is in an inactive mode. However, the side turn indicator, in an active mode, may be readily visible.

Systems, including fenders and/or side mirrors, integrated with a vehicle may include a side mounted light that includes light emission devices, a first lens and a second feature (e.g., lens or transmissive lettering. In one or more implementations, the side mounted light takes the form of a side turn indicator. The side mounted light may include a turn signal or a side marker light, as non-limiting examples. The turn signal may be configured to emit a flashing light when activated by a driver control (e.g., through an interface, such as a display or a lever of vehicle). The flashing light may be synchronized with at least one of a front and rear turn signal light. The side mounted light may emit an amber color, a 2 Amber color, or a red color, as non-limiting examples. The side mounted light may emit a red light with a minimum photometric intensity of 0.25 (cd)(2) when viewed from a 45 degree left or a 45 degree right test point. The letters "cd" may refer to candela. The side mounted light may emit an amber light with a minimum photometric intensity of 0.62 (cd)(2) when viewed from a 45 degree left or a 45 degree right test point. In one or more implementations, the side mounted light may include a mounting height of not less than 15 inches. In one or more implementations, the side mounted light may include a mounting height of not more than 83 inches from the ground.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system, comprising:
   a vehicle fender configured to surround a wheel of a vehicle; and
   a light source on the vehicle fender;

a transparent overlay that covers the light source;

an indicium disposed on the transparent overlay; and a material coated on the transparent overlay, wherein:

in an inactive mode of the light source, the material is configured to hide the indicium, and in an active mode of the light source, the light source generates light to the indicium and through the transparent overlay.

2. The system of claim 1, wherein:

the transparent overlay comprises lettering and is coupled with the vehicle fender, and the light source is configured to direct the light to the lettering.

3. The system of claim 2, wherein:

the vehicle fender comprises a recessed portion, and the light source is disposed in the recessed portion.

4. The system of claim 2, wherein the vehicle fender comprises a U-shaped body.

5. The system of claim 1, wherein:

the transparent overlay comprises lettering, and the light source is configured to direct a portion of the light to the lettering on a vehicle fender.

6. The system of claim 1, further comprising a lens between the transparent overlay and the light source, wherein:

the light source comprises a side turn indicator for a vehicle, and the overlay includes lettering that at least partially covers the side turn indicator.

7. The system of claim 6, wherein:

the transparent overlay comprises a coating, and the coating is configured to at least partially match a color of the vehicle fender.

8. The system of claim 6, further comprising a housing configured to carry the light source and couple with the vehicle fender, wherein the lens is positioned between the transparent overlay and the housing.

9. A vehicle fender, comprising:

a fender body configured to surround a wheel of a vehicle; and a side turn indicator carried by the fender body, the side turn indicator configured to provide a turn signal for the vehicle, the side turn indicator comprising:

a housing, a light source carried by the housing, a molded overlay that defines an indicium, a cover separate from the housing and configured to project light from the side turn indicator, wherein the light provides the turn signal, and a material that covers the molded overlay, wherein:

in an inactive mode of the light source, the material is configured to hide the indicium, and in an active mode of the light source, the light source generates light to the indicium and through the cover to provide the turn signal.

10. The vehicle fender of claim 9, further comprising:

a housing coupled with the fender body, wherein the housing carries the light source; and an overlay coupled with the housing, wherein the light source is configured to direct light toward the overlay.

11. The vehicle fender of claim 10, further comprising a lens, wherein the lens is positioned between the housing and the overlay.

12. The vehicle of fender claim 11, wherein the light source is positioned between the housing and the lens.

13. The vehicle fender of claim 10, wherein:

the overlay comprises an indicium, and the light source is configured to direct light toward the indicium.

14. The vehicle fender of claim 13, wherein the indicium is selected from a group consisting of lettering or a logo.

15. The vehicle fender of claim 13, further comprising a coating disposed on the overlay, wherein the coating is configured to at least partially match a color of the fender body.

16. The vehicle fender of claim 9, wherein:

the fender body comprises a recessed portion, and the light source is disposed in the recessed portion.

17. A vehicle, comprising:

a wheel; and a fender that at least partially surrounds the wheel, the fender comprising:

a fender body comprising a recessed portion; and a side turn indicator carried by the fender body at the recessed portion, the side turn indicator configured to provide a turn signal, the side turn indicator comprising:

a housing, a transparent overlay coupled with the housing, a light source carried by the housing, a molded overlay that defines in part an indicium, a cover positioned between the light source and the molded overlay, the cover configured to project light from the side turn indicator, and a material that covers the molded overlay, wherein:

in an inactive mode of the light source, the material is configured to hide the indicium, and in an active mode of the light source, the light source generates light to the indicium and through the cover to provide the turn signal.

18. The vehicle of claim 17, wherein the housing is coupled with the fender body and carries the side turn indicator.

19. The vehicle of claim 18, wherein:

the light source further comprises a lens, and the lens is positioned between the housing and the molded overlay.

20. The vehicle of claim 19, wherein the light source is positioned between the housing and the lens.

* * * * *